(12) United States Patent
Mnatsakanyan

(10) Patent No.: US 12,272,267 B2
(45) Date of Patent: Apr. 8, 2025

(54) SYSTEM FOR REMOTELY ACCESSING REAL AND/OR VIRTUAL INSTRUMENTS

(71) Applicant: Mariam Mnatsakanyan, New South Wales (AU)

(72) Inventor: Mariam Mnatsakanyan, New South Wales (AU)

(73) Assignee: Mariam Mnatsakanyan, New South Wales (AU)

( * ) Notice: Subject to any disclaimer, the term of this patent is extended or adjusted under 35 U.S.C. 154(b) by 671 days.

(21) Appl. No.: 17/618,011

(22) PCT Filed: Jun. 17, 2020

(86) PCT No.: PCT/AU2020/050611
§ 371 (c)(1),
(2) Date: Dec. 10, 2021

(87) PCT Pub. No.: WO2020/252526
PCT Pub. Date: Dec. 24, 2020

(65) Prior Publication Data
US 2022/0246054 A1    Aug. 4, 2022

(30) Foreign Application Priority Data

Jun. 18, 2019 (AU) .................................. 2019902108

(51) Int. Cl.
*G09B 9/00* (2006.01)
*G06Q 50/20* (2012.01)
(Continued)

(52) U.S. Cl.
CPC ............ *G09B 9/00* (2013.01); *G06Q 50/205* (2013.01); *G06T 19/003* (2013.01); *G06T 19/006* (2013.01); *G06N 20/00* (2019.01)

(58) Field of Classification Search
CPC ....................................................... G09B 9/00
See application file for complete search history.

(56) References Cited

U.S. PATENT DOCUMENTS 5,946,471 A    8/1999 Voorhees et al.
6,499,054 B1    12/2002 Hesselink et al.
(Continued)

FOREIGN PATENT DOCUMENTS

WO    2016/040985 A1    3/2016

OTHER PUBLICATIONS

Tawfik, Mohamed, et al: "AC 2012-3227: Common Multidisciplinary Prototypes of Remote Laboratories in the Educational Curricula of Electrical and Computer Engineering", Dec. 30, 2012 (Dec. 30, 2012), pp. 1-16, XP093051532, Retrieved from the Internet: URL:https://peer.asee.org/common-multidisciplinary-prototypes-of-remot••laboratories-in-the-educational-curricula-of-electrical-and-computer•engineering.pdf.
(Continued)

*Primary Examiner* — Peter R Egloff
(74) *Attorney, Agent, or Firm* — WARE, FRESSOLA, MAGUIRE & BARBER LLP

(57) ABSTRACT

Described herein is a system (100) for remotely accessing real and/or virtual instruments. The system (100) includes a user terminal (107) for virtually connecting with one or more real (102) or virtual instruments (105). The user terminal (107) includes: a user input device (109) configured to receive user input data; a display device (111) configured to receive display data and, in response, project images visible to the user on a display (110) of the display device (111); and an internet enabled computer (113) in communication with the display device (111) and user input device (109). The internet enabled computer (113) configured for communicating with an instrument server (117) to send the user input data and receive the display data. The instrument server (117) is configured to host software associated with a plurality of real (102) and virtual instruments (105). The software includes: virtual instrument software configured to (Continued)

virtually represent one or more virtual instruments (105); remote instrument access software configured to allow the user to remotely access real instruments (102) through one or more sensors and/or actuators embedded within or mounted to the instrument. The instrument server is further configured to: remotely control the real and/or virtual instruments based on the user input data; in response to the user input data, generate instrument data indicative of a current state of the real and/or virtual instruments (102, 105) as modified by the user input data; generate display data associated with the instrument data; and send the display data to the internet enabled computer (113) to allow the user to view data indicative of the real and/or virtual instruments (102, 105) in real-time thereby to simulate the user using one or both of the real and virtual instruments in real-time.

18 Claims, 11 Drawing Sheets

(51) Int. Cl.
*G06T 19/00* (2011.01)
*G06N 20/00* (2019.01)

(56) References Cited

U.S. PATENT DOCUMENTS

| | | | |
|---|---|---|---|
| 8,131,401 B2 | 3/2012 | Nasle | |
| 8,726,298 B1 | 5/2014 | Desai et al. | |
| 10,489,523 B2* | 11/2019 | Waltrich | G06F 30/15 |
| 2002/0147799 A1 | 10/2002 | Alhalabi et al. | |
| 2007/0124451 A1 | 5/2007 | Joshi et al. | |
| 2013/0117019 A1 | 5/2013 | Akopian et al. | |
| 2016/0314716 A1* | 10/2016 | Grubbs | G09B 23/306 |
| 2017/0213473 A1* | 7/2017 | Ribeira | G09B 5/10 |
| 2017/0319282 A1* | 11/2017 | Jarc | G09B 19/24 |
| 2019/0012769 A1 | 1/2019 | Arrieta | |
| 2020/0027210 A1* | 1/2020 | Haemel | G06F 9/547 |

OTHER PUBLICATIONS

Szentirmai, et al: "Internet at the service of electrical machinery and drives", Electrical Machines and Power Electronics And 2011 Electromotion Joint Conference (ACEMP), 2011 International Aegean Conference on, IEEE, Sep. 8, 2011 (Sep. 8, 2011), pp. 639-650, XP032352475, DOI: 10.1109/ACEMP.2011.6490675 ISBN: 978-1-4673-5004-4.

Arpaia, P., et al; "A Measurement Laboratory on Geographic Network for Remote Test Experiments", IEEE Transactions on Instrumentation and Measurement, vol. 49, No. 5; 2000; Entire document.

Shen, H., et al; "Conducting Laboratory Experiments over the Internet"; IEEE Transactions on Education, vol. 42, No. 3; 1999; Entire document.

Virtual instrument software architecture (VISA); retrieved from the Internet Mar. 27, 2020; https://en.wikipedia.org/w/index.php?title=Virtual_instrument_software_architecture&oldid=870281459; published Nov. 23, 2018; Entire document.

Interchangeable Virtual Instruments (IVI) Foundation; retrieved from the Internet Mar. 30, 2020; https://web.archive.org/web/20181018082504/https://www.ivifoundation.org/default.aspx; Published Oct. 18, 2018; Entire document.

* cited by examiner

SYSTEM FOR REMOTELY ACCESSING REAL AND/OR VIRTUAL INSTRUMENTS

CROSS-REFERENCE TO RELATED APPLICATIONS

This application is the U.S. National Stage of International Application Number PCT/AU2020/050611, filed on Jun. 17, 2020, published on Dec. 24, 2020 under International Publication Number WO 2020/252526, which claims benefit to an earlier filed Australian priority application No. 2019902108, filed Jun. 18, 2019. Both applications are hereby incorporated by reference in their entirety.

FIELD OF THE INVENTION

The present application relates to providing remote access to data indicative of real and/or virtual instruments, and in particular to a system and method for remotely accessing real and/or virtual instruments.

Embodiments of the present invention are particularly adapted for providing industrial education and training for scientific or biomedical instruments using virtual reality and/or a cloud-based instrumentation platform. However, it will be appreciated that the invention is applicable in broader contexts and other applications.

BACKGROUND

Educational institutions and organisations across the globe are the first and most common resource pool for the life sciences industry. However, as science attempts to keep pace with the increasing complexity of our world and its capability requirements, a gap in science graduate skill level has been identified.

It has been determined that only 35% of global companies have trust in the skills of recently graduated science students (Bloomberg, 2018) and together with the fact that most of these same companies are not willing to spend resources to train the new entrees, the future of science graduates is potentially at risk. In 2016, among surveyed recent science graduates who found full-time jobs, only half say their qualification was required or important for their job. In fact, in 2017, one of the lowest rates of full-time employment in Australia was in science graduates at 59.0%.

One problem is that operating teaching and research science labs to train the students' practical skills is highly costly and many universities struggle to keep up with the rising costs. As an example, consider a Liquid Chromatography-Mass Spectrometry (LC/MS) device, which is an instrument taught for pharmacy students and routinely used in pharmaceutical industry for drug quality control. The annual operating cost of an LC/MS device is upwards of $200,000, including a one-off purchasing cost of $126,000 in addition to maintenance and consumables. Most university teaching labs therefore cannot afford more than one or two such complex scientific instrumentations.

This, in addition to large class sizes and costly instrumental repairs, result in science graduates not trained individually on lab techniques that will help them find much needed employment.

To date, the Applicant is aware of YouTube teachings by non-experts and computer simulations which aim to improve training of scientific instruments. However, these offer one-way directed learning and education which are not interactive.

Any discussion of the background art throughout the specification should in no way be considered as an admission that such art is widely known or forms part of common general knowledge in the field.

SUMMARY OF THE INVENTION

In accordance with a first aspect of the present invention, there is provided a system for remotely accessing real and/or virtual instruments, the system including:
  a user terminal for virtually connecting with one or more real or virtual instruments, the user terminal including:
    a user input device configured to receive user input data;
    a display device configured to receive display data and, in response, project images visible to the user on a display of the display device;
    an internet enabled computer in communication with the display device and user input device, the internet enabled computer configured for communicating with an instrument server to send the user input data and receive the display data;
  an instrument server configured to host software associated with a plurality of real and virtual instruments, the software including:
    virtual instrument software configured to virtually represent one or more virtual instruments;
    remote instrument access software configured to allow the user to remotely access real instruments through one or more sensors and/or actuators embedded within or mounted to the instrument;
  wherein the instrument server is further configured to:
    remotely control the real and/or virtual instruments based on the user input data;
    in response to the user input data, generate instrument data indicative of a current state of the real and/or virtual instruments as modified by the user input data;
    generate display data associated with the instrument data; and
    send the display data to the internet enabled computer to allow the user to view data indicative of the real and/or virtual instruments in real-time thereby to simulate the user using one or both of the real and virtual instruments in real-time.

In some embodiments, the one or more sensors includes a camera mounted on or relative to a real instrument. In some embodiments, the one or more sensors includes sensors native to an instrument.

In some embodiments, the one or more actuators include instrument control mechanisms native to the instrument. In some embodiments, the one or more actuators include a robotic arm mounted to or adjacent a real instrument.

In some embodiments, the display device is a head mounted display. In some embodiments, the display device is a screen of the internet enabled computer.

In some embodiments, the user input device includes a computer keyboard. In some embodiments, the user input device includes a computer mouse. In some embodiments, the user input device includes a handheld virtual reality controller. In some embodiments, the user input device includes a touchscreen device such as a smartphone or tablet computer.

In some embodiments, the software includes an educational module for educating the user how to use the instrument. In some embodiments, the educational module includes presenting the user with information for correctly operating the instrument within a regulatory framework.

In some embodiments, the instrument server is further configured to store instrument information obtained during use by the user in a cloud database. In some embodiments, the instrument information includes real-time operational data of real instruments.

In some embodiments, the instrument server is configured to communicate with a learning management system to integrate the educational module with a structured assessment of the user. In some embodiments, the instrument server uses instrument data indicative of a current state of a real instrument to update the virtual instrument software. In some embodiments, the instrument server is configured to execute a machine learning process to update the virtual instrument software of a virtual instrument associated with a real instrument based on received instrument data from the real instrument. In some embodiments, the virtual instrument software includes a static model of the virtual instrument and the machine learning process is configured to build a dynamic model of the virtual instrument based on the received instrument data from the associated real instrument.

In some embodiments, the data indicative of the real and/or virtual instruments includes a visual representation of the instrument(s). In some embodiments, the data indicative of the real and/or virtual instruments includes operational parameters of the instrument(s).

In some embodiments, the remote instrument access software includes a central application programming interface (API) that is separate to a real instrument's dedicated API to allow the user to remotely access a real instrument via the central API. The central API may be hosted by the instrument server. The central API may be configured to allow a user to bypass an instrument's dedicated API to control the instrument.

In accordance with a second aspect of the present invention, there is provided a method for remotely accessing real and/or virtual instruments, the method including the steps:
  receiving user input data from a user input device in relation to operation of a real and/or virtual instrument;
  sending the user input data to an instrument server;
  hosting, on the instrument server, software associated with a plurality of real and virtual instruments, the software including:
  virtual instrument software configured to virtually represent one or more virtual instruments;
  remote instrument access software configured to allow the user to remotely access real instruments through one or more sensors and/or actuators embedded within or mounted to the instrument;
  remotely controlling the real and/or virtual instruments based on the user input data;
  deriving instrument data indicative of a current state of the real and/or virtual instruments as modified by the user input data;
  deriving display data based on the instrument data;
  representing the display data on a display of a display device thereby to enable the user to view data indicative of the real and virtual instruments in real-time.

In some embodiments, the data indicative of the real and/or virtual instruments includes a visual representation of the instrument(s). In some embodiments, the data indicative of the real and/or virtual instruments includes operational parameters of the instrument(s). In some embodiments, the data indicative of the real and/or virtual instruments includes display data of real-time experimental results. This may be provided in specific data formats such as ASCII text files.

In accordance with a third aspect of the present invention, there is provided a system for remotely controlling one or more instruments, the system including:
  a user terminal for connecting with one or more instruments, the user terminal including: a user input device configured to receive user input data;
  a display device configured to receive display data and, in response, project images visible to the user on a display of the display device;
  an internet enabled computer in communication with the display device and user input device, the internet enabled computer configured for communicating with an instrument server to send the user input data and receive the display data;
  an instrument server configured to host remote instrument access software associated with a plurality of instruments, the software configured to allow the user to remotely access real instruments through one or more sensors and/or actuators embedded within or mounted to the instrument;
  wherein, the instrument server remotely controls the instruments based on the user input data and sends the display data to the internet enabled computer to allow the user to view data indicative of the instruments in real-time.

In some embodiments, the remote instrument access software includes a central application programming interface (API) that is separate to a real instrument's dedicated API to allow the user to remotely access a real instrument via the central API.

In accordance with a fourth aspect of the present invention, there is provided a method of generating a virtual instrument based on operation of a real instrument, the method including:
  generating a static virtual instrument model representing a digital version of a corresponding real instrument, the static virtual instrument including a digital model of the real instrument, predefined inputs and outputs, and instrument operating functions;
  receiving operational data of the corresponding real instrument, the operational data including user inputs and instrument outputs;
  passing the operational data to a machine learning algorithm to determine relationships between the user inputs and instrument outputs; and
  based on the determined relationships, updating the instrument operating functions of the virtual instrument model to generate a virtual instrument.

In some embodiments, the operational data includes data indicative of a current state of the corresponding real instrument and wherein the machine learning algorithm also determines relationships between the current state of the corresponding real instrument and the instrument outputs to update the instrument operating functions of the virtual instrument.

In some embodiments, the operational data includes video images from cameras monitoring the real instrument during instrument operation. In some embodiments, in response to the determined relationships, the machine learning algorithm transmits notifications to a server hosting the virtual instrument to update operating software for the virtual instrument.

BRIEF DESCRIPTION OF THE FIGURES

Example embodiments of the disclosure will now be described, by way of example only, with reference to the accompanying drawings in which.

DESCRIPTION OF THE INVENTION

Embodiments of the present invention will be described with reference to remotely accessing and controlling real and/or virtual scientific or biomedical instruments typically found in research laboratories. However, it will be appreciated that the invention is also applicable for remotely accessing and controlling other types of real or virtual devices.

System Overview

Figure 1:
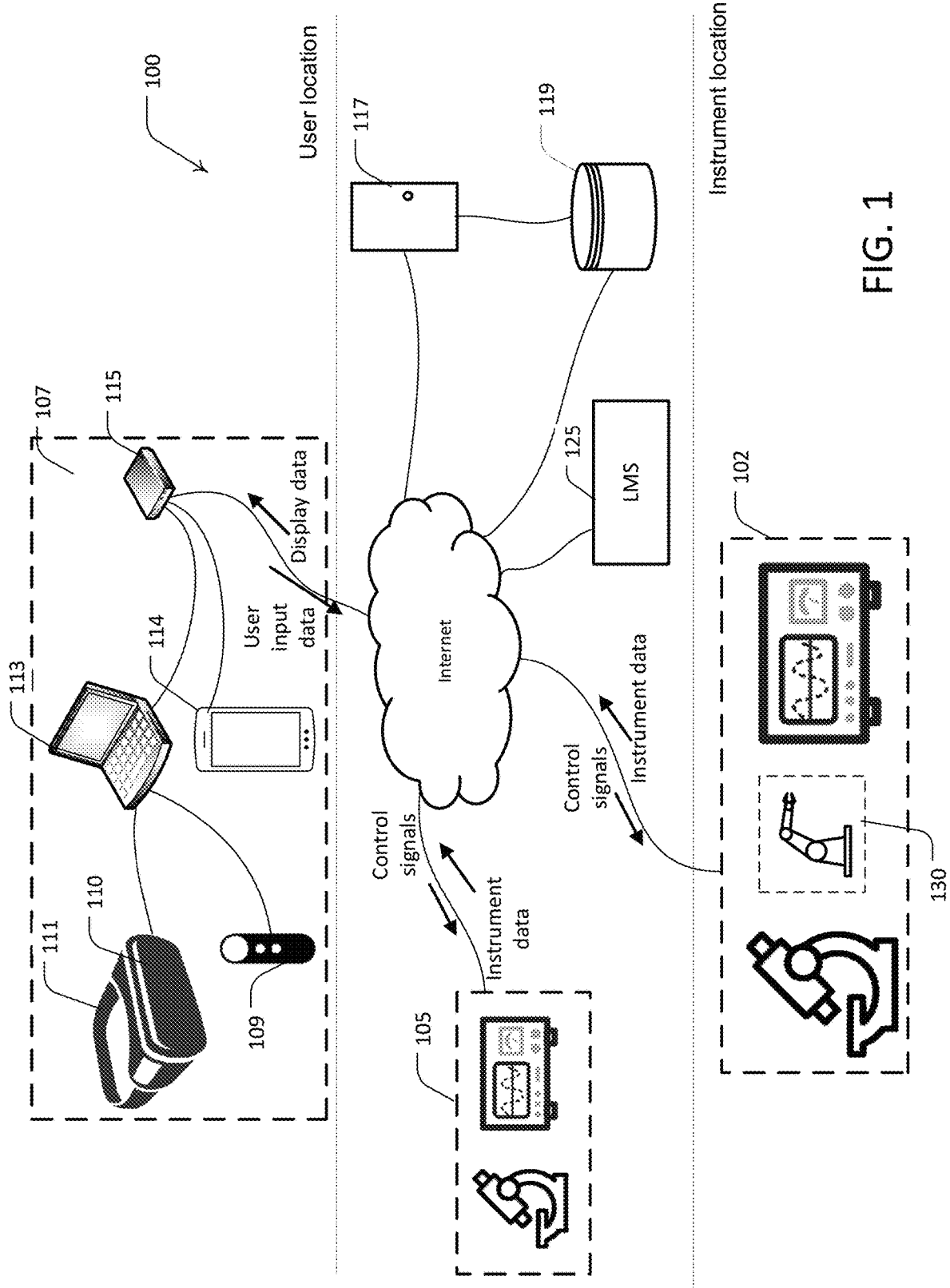
FIG. 1 is a schematic illustration of a system for remotely accessing real and/or virtual instruments.
Figure 2:
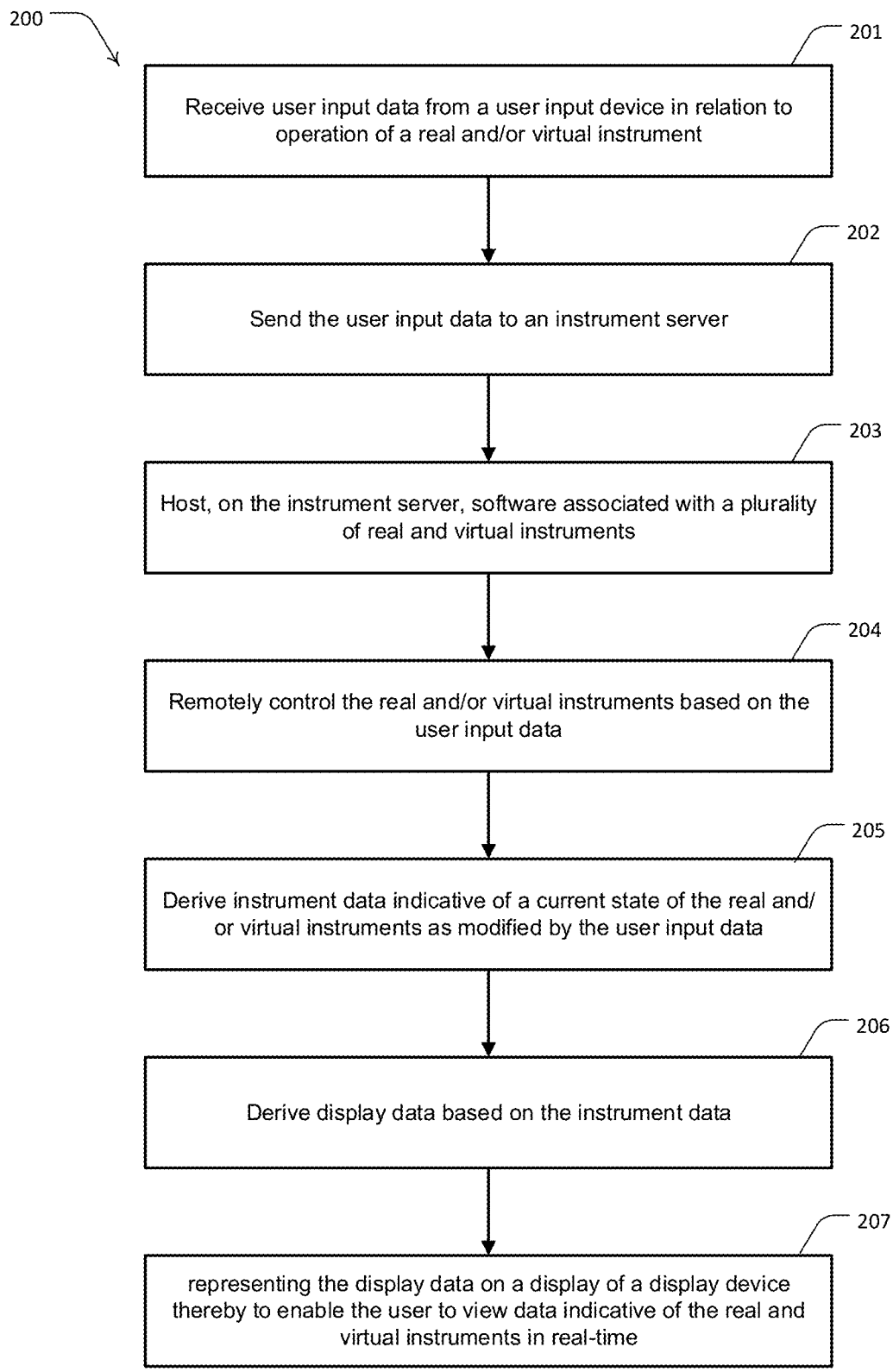
FIG. 2 is a process flow diagram illustrating the primary steps in a method for remotely accessing real and/or virtual instruments.

Referring to FIGS. 1 and 2, there is illustrated a system 100 for remotely accessing real instruments 102 and/or virtual instruments 105. System 100 is adapted for performing a method 200 for remotely accessing the real and/or virtual instruments by virtually connecting a user at a user location with real instruments 102 located at a separate instrument location and/or virtual instruments 105 stored and accessed online. At the user location, a user terminal 107 is provided for receiving user input and providing visual content and optionally audio content to the user. User terminal 107 includes a user input device in the form of handset controller 109 configured to receive user input data through user movement and button actuation. An example handset controller is a PyVISA Raspberry Pi controller. In other embodiments, the user input device may take other forms such as a computer keyboard, mouse, joystick, power glove, VR glove, eye gaze tracking system, touchpad and/or touchscreen (e.g. smartphone or tablet computer).

A display device in the form of a virtual reality headset 111 is configured to receive display data and, in response, project images visible to the user on a display 110 of headset 111. Use of virtual reality headset 111 provides the user with an immersed experience in using the real or virtual instrument. However, in other embodiments, the display device may include other types of head mounted display, a computer screen (such as the screen of computer 113), television screen, mobile device (smartphone or tablet computer) screen or other image projection device. Headset 111 may also be configured to output audio information to the user through one or more speakers.

An internet enabled computer such as laptop computer 113 is in communication with headset 111 and controller 109 for sending the display data and receiving the user input data. Headset 111 and controller 109 may be connected to computer 113 using conventional means such as Universal Serial Bus (USB) cable. Although illustrated as physical connections, it will be appreciated that computer 113 may be connected to headset 111 and controller 109 through a wireless connection such as Bluetooth or Wi-Fi protocols. In other embodiments, the internet enabled computer includes a desktop computer or portable device such as a tablet computer or smartphone.

At step 201, user input data is received from user input device 107 in relation to operation of a real and/or virtual instrument. In the illustrated embodiment, user input is provided through controller 109 and/or through a keyboard or mouse associated with computer 113. In some embodiments, user input data may be received from a virtual interface displayed on headset 111 which includes one or more virtual buttons selectable by the user. When actuated by controller 109 or other gestures of the user, the buttons generate user input data. For example, a virtual control panel of an instrument may be displayed on headset 111 and manipulated by the user through controller 109 and/or user gestures.

In some embodiments, the functions of the display device, the internet enabled computer and the user input device may all be provided by a single computer device such as a smartphone 114, laptop computer or tablet computer.

At step 202, computer 113 is configured for communicating, through a modem 115, with an instrument server 117 to send the user input data and receive the display data. Communication between computer 113 and modem 115 may be through a wired connection (e.g. Ethernet cable) or wirelessly (e.g. over Wi-Fi). Although illustrated as being a separate device to computer 113, modem 115 may be co-located within the housing of computer 113.

Instrument server 117 is preferably a cloud-based server hosted and delivered by a cloud computing platform. As such, server 117 may represent data stored at various geographical locations rather than a single location.

Server 117 is able to communicate with a database 119 for accessing relevant data as described below. Database 119 may be a single store of data or may be a cloud-based database such as Google Cloud Platform having resources distributed at different locations.

Figure 3:
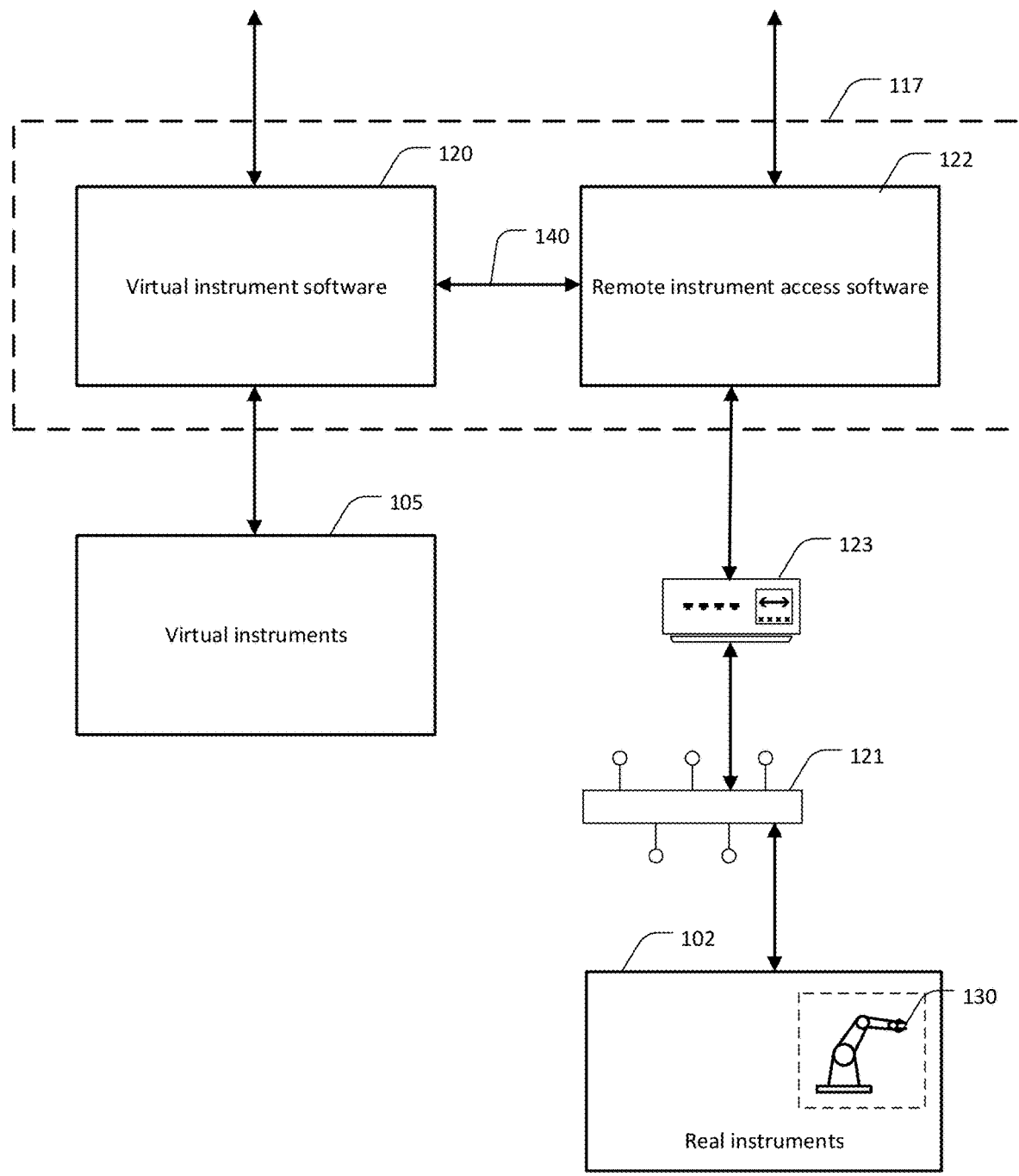
FIG. 3 is a schematic illustration of software modules hosted on an instrument server.

At step 203, instrument server 117 is configured to host software associated with both the real instruments 102 and virtual instruments 105. In some embodiments, instrument server 117 may be specifically configured to only host software associated with real or virtual instruments. Referring now to FIG. 3, the software hosted on instrument server 117 includes virtual instrument software 120 configured to virtually represent a plurality of virtual instruments 105. Instrument server 117 also hosts remote instrument access software 122 configured to allow the user to remotely access real instruments 102 through one or more sensors and/or actuators embedded within or mounted to the instrument. These sensors and actuators may be Internet of Things (IoT) compatible sensors/actuators configured to communicate bidirectionally with corresponding nodes such as Power Line Communication (PLC) nodes.

The real instruments 102 are hosted on a local network 121 such as a Process Control Network (PCN) or Ethernet by an associated organisation such as the instrument owner and/or a research institution. The nodes of the local network in turn communicate the instrument data to instrument server 117 via an intermediate gateway 123 such as an IoT gateway. In some embodiments, remote instrument access software 122 runs through the Virtual Instrument Software Architecture (VISA), which is a standard Application Programming Interface (API) for configuring, programming, and troubleshooting instruments which comprise General Purpose Interface Bus (GPIB), VME Extension for Instrumentation (VXI), PCI Extensions for Instrumentation (PXI), Serial, Ethernet, and/or USB interfaces.

Some instruments have their own dedicated or proprietary API that is specific to that instrument or instrument manufacturer. These APIs may have specific restrictions on the control of the instrument, such as data recording, storage and transfer restrictions. In some embodiments, instrument server 117 is configured to identify an instrument's API and provide an alternative control method which utilises a 'central' or non-manufacturer proprietary API that provides access to most standard interfaces including GPIB, VXI, PXI, Serial, Ethernet, and/or USB and not bounded by restrictions (or fewer restrictions). This central API is created and hosted by the system administrator to give authenticated and secure real-time access to a number of the real and virtual instruments, thereby bypassing individual instrument interfaces or bypassing the layer between instrument server 117 and the interface of the real instruments. This central API will be accessible to all users of the system. Different central APIs are created for real instruments and virtual instruments.

The central API, which will serve as an API for many instruments, may be stored on instrument server 117 or associated database 119 and accessed when necessary. The central API may include standards for interacting with standard components like sensors and actuators. In some embodiments, the central API utilises the VISA architecture, for example PyVISA, where python can be used for data collection and analyses from each respective sensor and storage of it in the server.

Instrument server 117 may be able to host both the central API for virtual instruments and the manufacturer's API, so third parties can have access to these real instruments using a manufacturer's API and server 117 serves as a host only. The users may then use and trial a specific instrument using the familiar manufacturer's API. Alternatively, some instrument manufacturers may provide permission for server 117 to access or bypass their APIs and allow users to use the central API.

By way of example, when instrument server 117 identifies certain restrictions provided by an instrument's dedicated API that conflicts with requests from a user, instrument server 117 may enable the central API to provide a greater degree of control over the instrument.

System 100 is compatible with any available real instrument, which may also be simulated as virtual instruments. By way of example, suitable instruments representing both real and virtual instruments for system 100 include:

Scales;
Flow cytometers;
UV/VIS Spectrophotometers;
IR Spectrophotometers;
Electron Microscopes;
USP dissolution apparatus;
HPLC detectors (e.g. HPLC-UV-DAD and HPLC-DAD-ESI-MS);
UPLC detectors (e.g. UPLC-TOF-MS);
Gas Chromatography Flame Ionization detectors (GC-FIDs);
Fourier Transform Infrared Spectroscopy (FTIR) devices; and
Nuclear Magnetic Resonance devices (e.g. NMR-H and C).

Example sensors include one or more cameras mounted on or relative to a real instrument and internal instrument-embedded sensors. For example, an electron microscope may include a camera mounted near the tip for positioning the tip at a desired position on a sample. The sensors may also include sensors native to an instrument. For example, an electron microscope includes sensors to measure voltage and/or current and one or more microcontrollers to process, interpret and format the data. Example actuators include robot arms, motors, microelectronic devices, electrooptic devices, sample mounts, piezoelectric devices, moveable stages and linear actuators. All or some of these sensors and actuators may be IoT compatible for communication via IoT network protocols such as via a local Ethernet to a PCN/node-transferring and subsequent wireless or non-wireless transmission to the internet. Data obtained from these sensors is stored in a local database but may also be transmitted in real-time or delayed time to database 119. Choice of an appropriate local microcontroller within the instruments is important to ensure sufficient speed and data security. By way of example, system-on-chip or system-on-module type microcontrollers may be used which may utilise the ARM computing architecture. Database 119 may also be configured to store the software associated with virtual instruments 105.

At step 204, instrument server 117 facilitates the remote controlling of the real instruments 102 and/or virtual instruments 105 in real-time based on the user input data. In some embodiments, this process is performed using Google Cloud Messaging Service (GCMS) and/or modem 115, which communicates data between controller 109 and instruments 102 via remote instrument access software 122. Via the GCMS and/or modem 115, an update is sent to remote instrument access software 122 regarding an instrument status, which includes the user input data to update the instrument. Instrument server 117 is also adapted to send control signals between user terminal 107 and real instruments 102 to control one or more actuators on or adjacent to the instruments.

One example actuator is a robotic arm 130 such as the BenchBot Robot manufactured by the Agilent, F5 Robot System by the ThermoFisher Scientific or PincherX 100 Robot Arm manufactured by Trossin Robotics, as best illustrated in FIGS. 1 and 3. Robotic arm 130 is connected to or positioned adjacent to an instrument and adapted to receive user input data from controller 109 in the form of control commands via remote instrument software 122. Robotic arm 130 is capable of performing various simple or complex instrument control actions on behalf of the user in real-time or near real-time. During this process, software 122 translates user input into control signals for robotic arm 130. For example, robotic arm 130 may include a pincer having two opposable gripping elements for grasping items and pressing buttons to operate the instrument. During these processes, the need for real-time user interaction is important, especially where the process is time sensitive such as when handling hazardous chemicals.

During complex control processes using robotic arm 130, instrument software 122 links robotic arm 130 with the various sensors in the instrument, including a camera to provide for more accurate translation of input commands from remote instrument users.

In some embodiments, the actuators include instrument control mechanisms native to the instrument through the native software in-built to the instrument. By way of example, the control signals are capable of controlling the above described camera mounted to an electron microscope and also the in-built actuators for controlling the microscope tip. In some embodiments, third party software such as "Labview", developed by National Instruments, is utilised for controlling the instrument. Another suitable third party software product is the i-Series Plus developed by Shimadzu Corporation.

In some embodiments, one or more of the actuators are external to the instruments but are used to control the instruments' native in-built software. Software controlling actions may be transferred from the user terminal to the native instrument software to control it.

Instrument server 117 is further adapted to execute virtual instrument software 120 for operating virtual instruments 105. Here, control signals from user terminal 107 are translated into software controls for the various operations of the virtual instruments 105. Operation of virtual instruments 105 simulate operation of corresponding real instruments and allows a user to be trained on the use of the instrument prior to having access to a real instrument. More details on operation of virtual instruments is set out below.

Virtual instruments 105 are digital versions of real instruments stored on instrument server 117 as software applications. The appearance and operation of these virtual instruments closely matches that of the corresponding real instruments (they replicate the real instruments). In some embodiments, the virtual instruments are authorised digital copies of commercially available real instruments. Once executed by instrument server 117, a graphical representation of the virtual instrument is presented on display 110, (e.g. of headset 111, computer 113 or a mobile device). As mentioned below, machine learning can be adopted to improve the accuracy of the simulation of virtual instruments to more closely match that of the corresponding real instrument.

At step 205, instrument server 117 derives instrument data indicative of a current state of the real instrument 102 and/or virtual instrument 105 being controlled as modified by the user input data. During this step, data is fed from the real instruments 102 during instrument operation into the remote instrument access software 122, which then updates the instrument status in the instrument server 117. Similarly, data is fed from virtual instruments 105 during operation into the virtual instrument software 120, which then updates the virtual instrument status in the instrument server 117.

Example tasks include step-by-step instrument operation such as adjusting a temperature control, pressure control or taking action to rectify a solvent leak. The outcome is a change in state of the instrument which is read by the sensors and transmitted to instrument server 117.

In this manner, data is regularly extracted from the instrument under control and updated at server 117 and/or database 119. In the case of controlling a real instrument, this process is a simple data extraction from the host instrument. In the case of a virtual instrument, the derivation process forms part of the virtual instrument software 120 which modifies the operational state of the virtual instrument 105 and produces updated instrument data. This data extraction process preferably occurs as a data pull process at sufficiently regular times so as to facilitate real-time or near real-time operation of the instrument.

Exemplary instrument data derived from an instrument under control includes:
  Current instrument parameters (e.g. tip position, wavelength, voltage, current etc.).
  Video data from a camera mounted to or relative to a real instrument.
  Real-time operational data of real instruments.
  Measurement parameters (e.g. sample measurements, peak wavelength, image scan data, chromatograms, mz scans, pump pressure, flow rates, absorbance profiles and any connected experimentally measured result.)

At step 206, instrument server 117 derives display data based on the instrument data. Finally, at step 207, the display data is sent to user terminal 107 and represented on display 110 of headset 111 thereby to enable a user to view data indicative of the real and virtual instruments in real-time.

This display data includes data to be displayed to the user through headset 111 or other display interface such as computer 113 or smartphone 114. In the case of real instruments 102, the display data may include video feed from one or more cameras mounted on or relative to the instrument overlaid or augmented with instrument data. As mentioned above, a virtual control panel may be displayed on headset 111 for manipulation by a user. This virtual control panel may include one or more displays for displaying instrument data. Such a virtual control panel and the associated instrument data are examples of the display data that can be sent to headset 111 from instrument server 117.

Figure 4:
FIG. 4 is a schematic illustration of an exemplary virtual control panel for a virtual instrument.

An exemplary virtual control panel for a virtual instrument is illustrated in FIG. 4, in which a virtual laboratory is illustrated with various features having selectable information labels for initiating a virtual activity (e.g. 401, 402). This virtual laboratory is built with elements based on the Chemstation32, developed by Agilent Technologies. For cloud-based instrumental training, it is necessary to include inbuilt software specific to existing instruments on the market. Today, most new scientific instrumentation are sold with such software. A vertical list 404 of selectable icons is also displayed. A user is able to select icons from list 404 using controller 109 to initiate one of a plurality of virtual activities such as a training or educational exercise.

In conjunction with the display data sent to user terminal 107, audio data may also be transmitted and generated into audio output through a speaker of headset 111 or computer 113. This audio data may include data indicative of verbal instructions on how to operate the instrument. The audio data may also include a real-time feed of audio from one or more microphones on or near a real instrument.

In the above manner, instrument server 117 remotely controls the real and/or virtual instruments based on the user input data and sends the display data to the internet enabled computer to allow the user to view data indicative of the real and/or virtual instruments in real-time thereby to simulate the user using one or both of the real and virtual instruments in real-time.

Method 200 is repeated in an ongoing basis for remotely accessing and controlling real or virtual instruments in real-time. During operation, instrument server 117 is configured to store instrument information obtained during use by the user in a cloud database such as database 119. This allows for subsequent access to the data by a user or third party.

Learning Management System

As will be described below, in some embodiments, virtual instrument software 120 and/or remote instrument access software 122 include an educational module in the form of a Learning Management System (LMS) 125 for educating the user how to use the instrument. The LMS includes software for presenting the user with information for correctly operating the instrument within a regulatory framework. This may include a predefined educational software program and/or content delivered by an instructor in real-time or pre-recorded. Operation of the virtual instruments 105 may be updated based on real instrument operation through a data transfer process between remote instrument access software 122 and virtual instrument software 120 (see arrow 140 in FIG. 3) as described below. In this manner, real-time or stored data from real instruments (status of instrument, camera data, measurement results etc.) can be fed to the virtual instrument software 120 to upgrade virtual instrumental scenarios based on artificial intelligence such as deep learning algorithms.

The LMS 125 may be hosted by instrument server 117 and accessible to the user via a user dashboard (described below). In some embodiments, instrument server 117 is also configured to communicate with a third party Learning Management System such as Moodle, Canvas or Blackboard Learn to integrate the educational module with a structured assessment of the user.

LMS 125 may be hosted by an organisation such as a university and different access levels or unique learning management systems offered by different organisations.

In some embodiments, LMS 125 allows for online education to a plurality of viewers via a videoconference facility in which control of one or more instruments may be shared between participants. This allows the facilitation of online education where instructors can demonstrate use of a real or virtual instrument to students/trainees and students/trainees can temporarily assume control of the instruments for training or assessment purposes.

Dynamic Virtual Instrument Creation

In some embodiments, instrument server 117 is configured to execute a machine learning algorithm to update the virtual instrument software 120 of a virtual instrument associated with a real instrument based on received instrument data from the real instrument. This process is possible where a real instrument has an associated virtual instrument that is a digital twin or simulated model of real instrument. The virtual instrument software 120 may include a static model of the virtual instrument and the instrument server 117 hosts a machine learning process that is configured to build a dynamic model of the virtual instrument based on the received instrument data from the associated real instrument. Otherwise, a static model of the virtual instrument may be generated by a user. The static model includes at least a three dimensional physical model of the instrument, the same inputs and outputs and the software to run the corresponding real instrument. Thus, the static model replicates the corresponding real instrument in terms of appearance and provides for receiving inputs and providing outputs corresponding to that real instrument. The static model may also include tables of input and output variables for which the functions that map the inputs to outputs will change dynamically during the machine learning process. However, the static model does not have complete data tables and operational functions which correctly mimic the operation of the real instrument across a number of different scenarios. Static instruments may be fully interactive, meaning that a user can push virtual buttons, open virtual valves and doors but overall it is static because it is based on one predefined type of 3D static model.

During step 205 described above, as a user operates a real instrument, instrument server 117 derives instrument data (or operational data) indicative of a current state of the real instrument 102. This instrument data includes the inputs provided by the user through user terminal 107 as well as outputs from the instrument such as measurement outputs and instrument conditions. Instrument server 117 executes a machine learning algorithm to iteratively learn patterns and relationships between the inputs and outputs to the instrument to learn how the real instrument operates. The types of machine learning algorithm used to perform this process may include supervised, unsupervised, semi-supervised, deep learning or reinforcement learning algorithms such as regression, decision tree, Bayesian, deep learning or artificial neural network algorithms.

During this learning process, instrument server 117 uses instrument data indicative of a current state of a real instrument to update or add rules or functions to the static model of the virtual instrument stored in the virtual instrument software 120. The algorithm will analyse real machine embedded sensor generated data, and mounted video data, analysing millions of different poses and scenarios which then will be downloaded by the virtual instrument software 120 of a given instrument to update the scenario. This data exchange process is illustrated by arrow 140 in FIG. 3. By continued use of the real instrument by users, the rules and functions that govern operation of the virtual instrument can be built and adapted to closely mimic that of the real instrument. This allows a dynamic working model of a virtual instrument to be built from the original static model of the virtual instrument stored on instrument server 117 using machine learning.

By way of example, a user operating a real IR spectrophotometer conducts experiments on a particular material sample. The user inputs such as wavelength scanning range, scanning resolution, sample parameters and sample positioning are received and stored in instrument server 117. The instrument outputs such as sample measurements, operating voltages, signal to noise ratios and the like are also fed to instrument server 117. These data are passed through the machine learning algorithm to update the rules and functions governing the operation of an associated virtual instrument for that IP spectrophotometer and ultimately build a dynamic virtual instrument.

In addition, video images from cameras monitoring the instruments and experiments may be fed to a computer vision algorithm to analyse the video to extract additional information. This video information may be used to augment the training of the machine learning algorithm and more accurately build a dynamic virtual instrument.

Exemplary System Operation

While it will be appreciated that system 100 provides for a wide variety of applications, some exemplary applications of system 100 will now be described, with a focus on education and training of users. Exemplary operation of System 100 is described with reference to FIG. 5, which illustrates the data flows within the elements of system 100.

System 100 is operated by a user by initially executing a virtual reality application 501 stored on computer 113. Application 501 links with headset 111 by sending display data to headset 111 for displaying on display 110 and with controller 109 to receive user input data. Application 501 also links with instrument server 117 for sending the user input data and receiving display data.

Through bidirectional information communication with instrument server 117, the user is presented with an interface or dashboard 503 comprising a number of navigable menus. Menu options are selected by user input through controller 109. Exemplary dashboard menus are illustrated in FIGS. 6-9.

Figure 6:
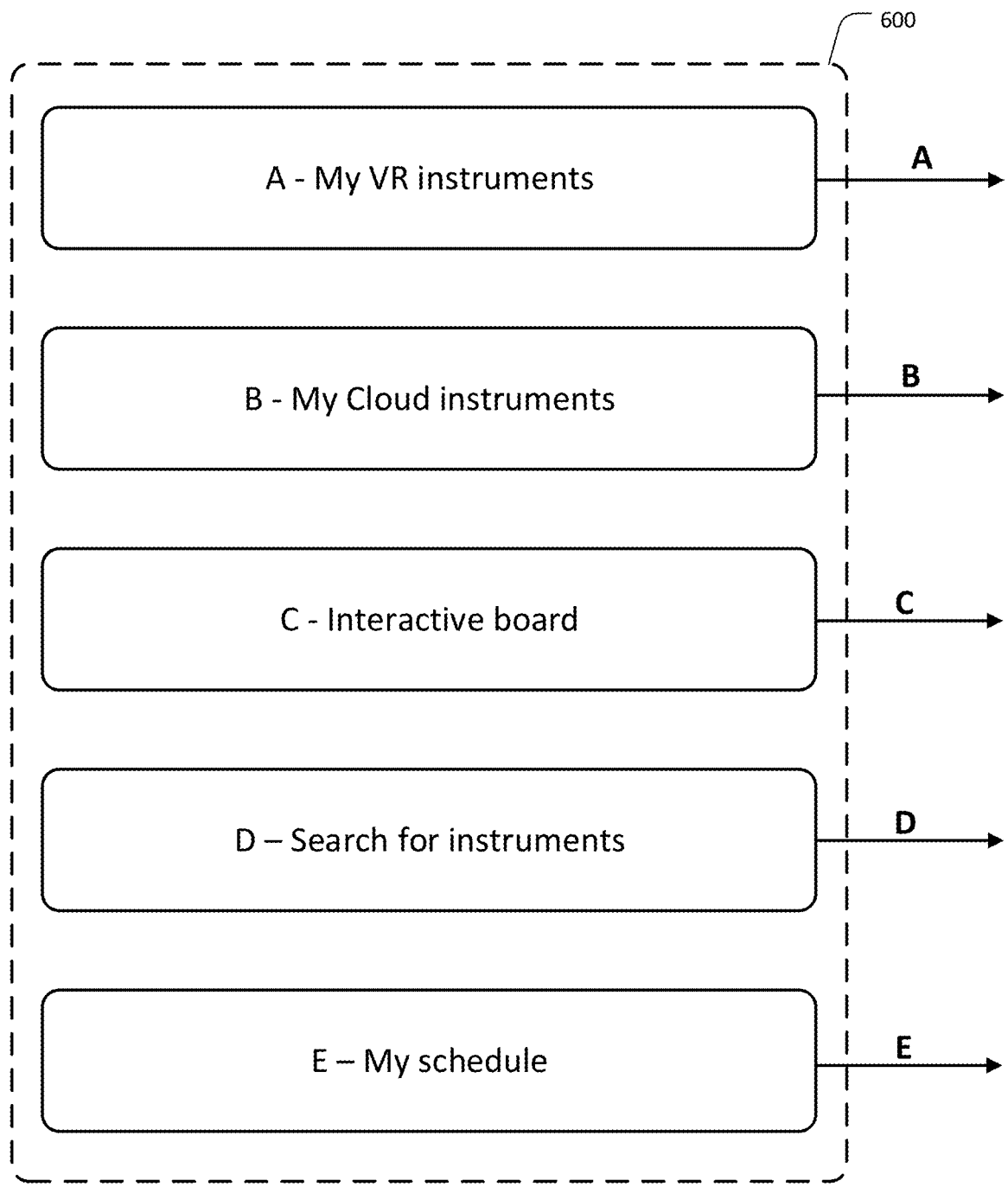
FIG. 6 is an illustration of an exemplary landing menu displayed for a user on a display device.

Referring initially to FIG. 6, there is illustrated an exemplary landing menu 600 of dashboard 503 which is presented to user via display 110 of headset 111. The menu includes the options:

A. "My VR instruments", which launches the virtual instrument software 120 for operating virtual instruments 105 to perform training.

B. "My cloud instruments", which launches the remote instrument access software 122 for accessing internet connected real instruments 102.
C. "Interactive board", which allows users to facilitate real-time discussion between students and teachers through an interconnected application with a Learning Management System.
D. "Search for instruments", which allows users to search for new real and virtual instruments to use based on description, location, organisation (e.g. university), experiment type, or a unique identifier such as an instrument IP address.
E. "My schedule", which allows users to access a schedule of instrument access that has been requested and/or granted. This may take the form of a virtual calendar having timeslots designated for use of the instruments. Real instruments will typically require exclusive use while virtual instruments will not.

Within menu items A and B, a number of links to virtual and real instruments are able to be stored and saved for quick access by the user. Using menu item D, the user is able to search for new instruments to use, schedule or request access to. Once identified, the user is able to select them to be added to a list of favourites to be added to "My VR instruments" or "My cloud instruments" menus.

In the "My schedule" menu, users are able to view, modify and cancel scheduled instrument access events in a similar way to managing events in virtual calendars such as Microsoft Outlook or iOS Calendar developed by Apple Inc.

Figure 7:
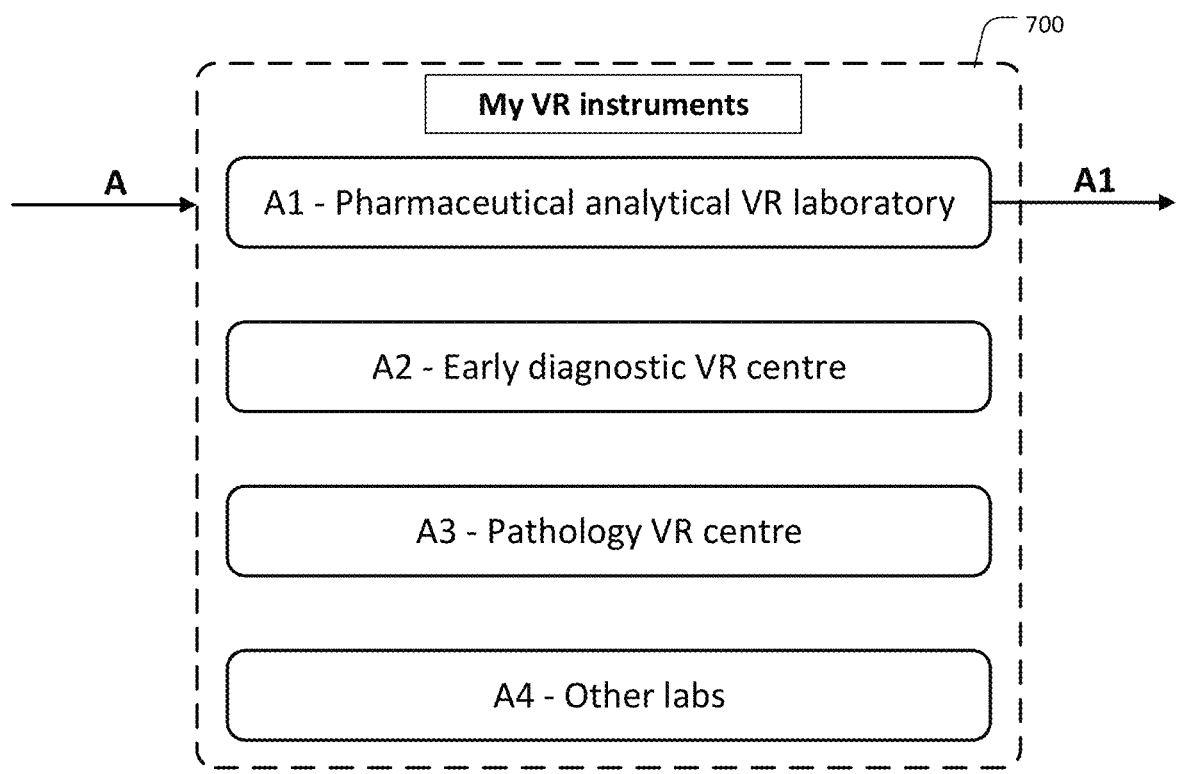
FIG. 7 is an illustration of an exemplary first sub-menu.

Upon selection of menu item A, relating to the virtual instruments, the user is navigated to a second menu 700 illustrated in FIG. 7. Menu 700 includes the following four menu options:
A1. "Pharmaceutical analytical VR laboratory", providing the user with access to a pharmaceutical VR laboratory using virtual instruments 105.
A2. "Early diagnostic VR centre", providing the user with access to an early diagnostic VR centre using virtual instruments 105.
A3. "Pathology VR centre", providing the user with access to a pathology VR centre using virtual instruments 105.
A4. "Other labs", providing the user with access to other virtual laboratories available through the system. Additional modules may be added by administrative users.

Each of these menu items, once selected by the user through controller 109, navigates the user to one of four different educational software programs for use with the virtual instruments 105. It will be appreciated that these particular menu items are exemplary only to indicate suitable groupings of instruments for filtering the virtual instruments from a potentially large number of virtual instruments available.

Figure 8:
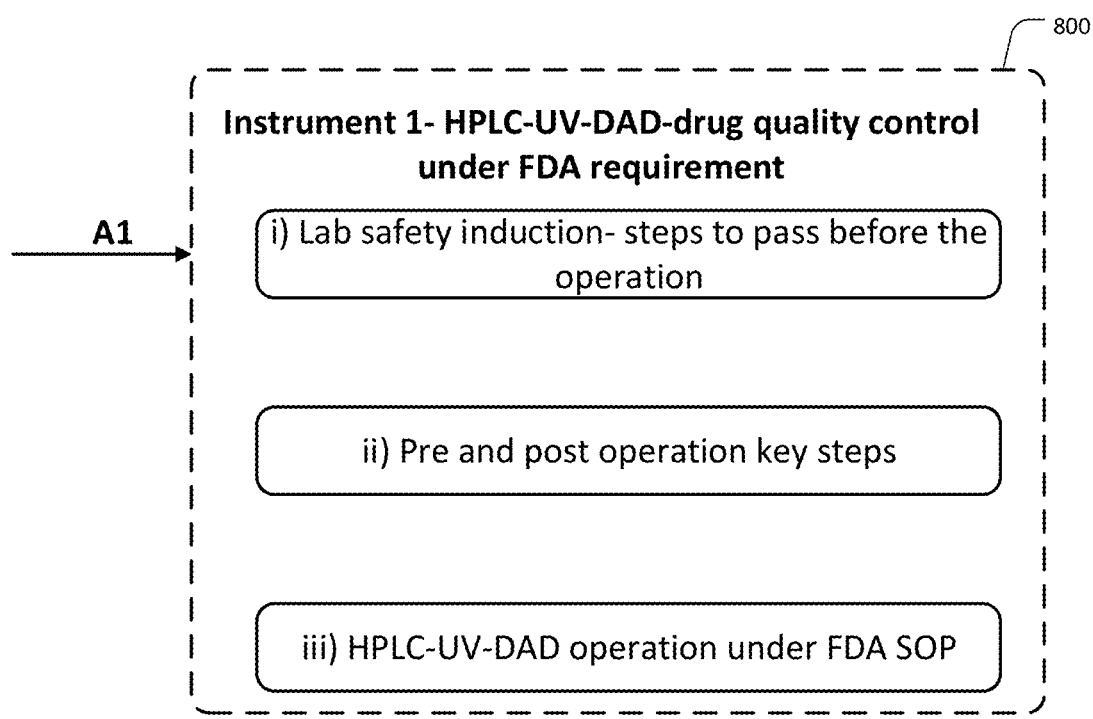
FIG. 8 is an illustration of an exemplary second sub-menu.

Upon selection of menu item A1, the user is navigated to a third menu 800, illustrated in FIG. 8. Menu 800 includes the following three menu options:
i) "Lab safety induction—steps to pass before the operation".
ii) "Pre and post operation key steps".
iii) "HPLC-UV-DAD operation under FDA SOP".

The options in menu 700 represent educational training modules to educate the user about the use of a HPLC detector HPLC-UV-DAD for drug quality control under FDA requirement. All of these options represent sub-routines executable as part of the virtual instrument software 120. This results in control signals being sent from instrument server 117 to control the virtual instruments based on the user input data and corresponding instrument data being sent from virtual instruments 105 to instrument server 117 and subsequently to user terminal 107, as illustrated best in FIG. 5.

Figure 9:
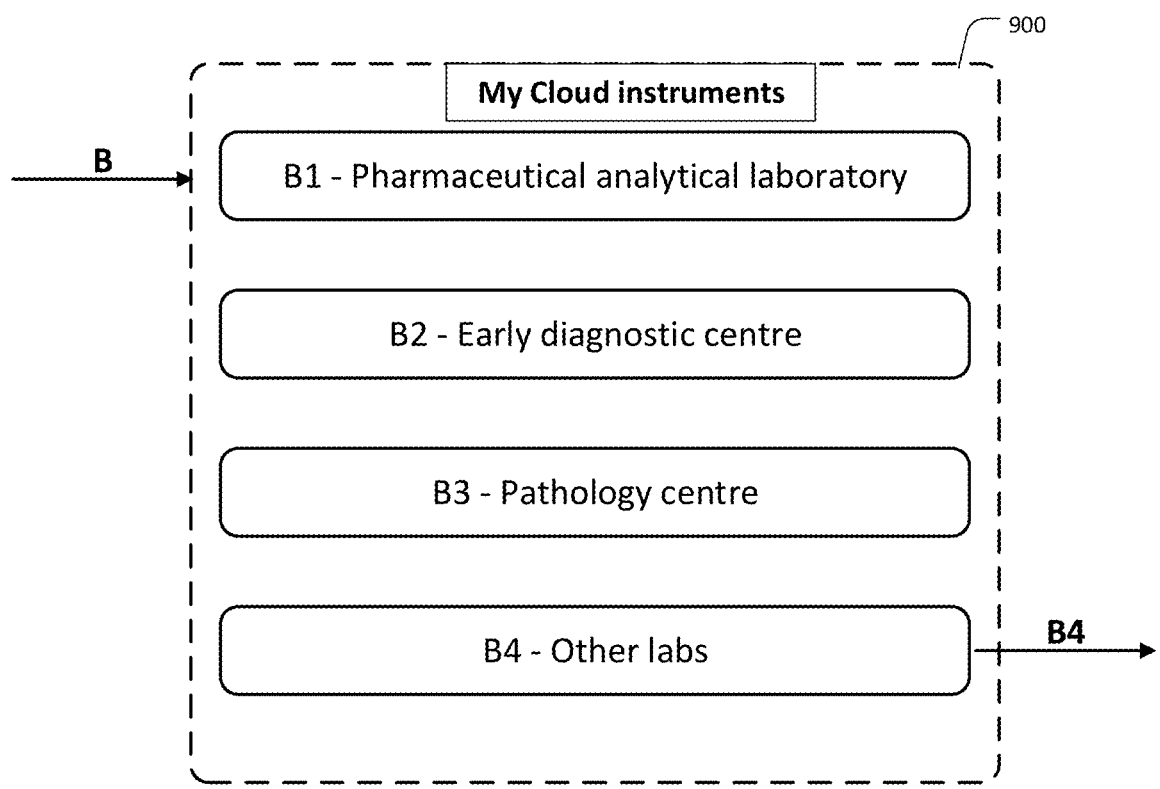
FIG. 9 is an illustration of an exemplary third sub-menu.

Returning to menu 600 of FIG. 6, upon selection of menu item B, the user is navigated to menu 900, illustrated in FIG. 9, which relates to accessing real instruments 102. Menu 800 includes the following four menu items:
B1. "Pharmaceutical analytical laboratory", providing the user access to pharmaceutical related real instruments.
B2. "Early diagnostic centre", providing the user access to diagnostic related real instruments.
B3. "Pathology centre", providing the user access to pathology related real instruments.
B4. "Other labs", providing the user access to various other real instruments. These other instruments may optionally be grouped under additional menu items which can be created by administrative users.

Figure 10:
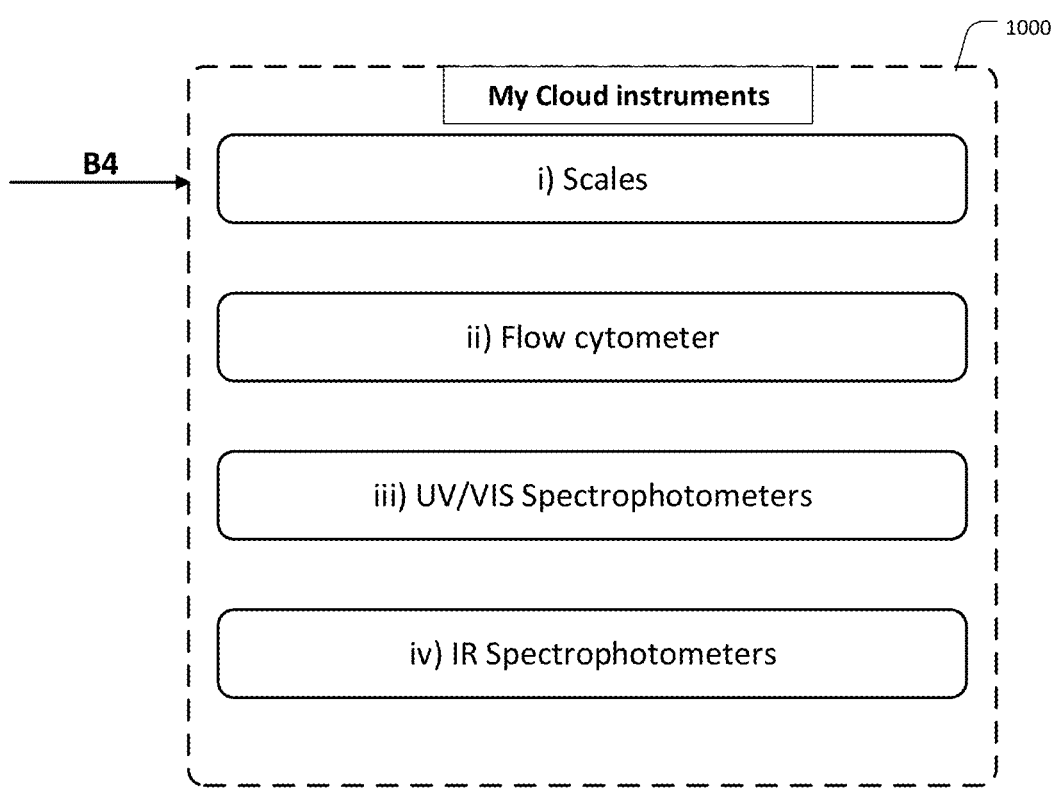
FIG. 10 is an illustration of an exemplary fourth sub-menu.

Within each of the menu items in menu 900, various internet connected real instruments are accessible. It will be appreciated that these particular menu items are exemplary only to indicate suitable groupings of real instruments for filtering the real instruments from a potentially large number of real instruments available. Upon selection of menu item B4 in menu 900, the user is navigated to menu 1000 illustrated in FIG. 10. Menu 1000 includes the following four menu items:
i) Scales.
ii) Flow cytometer.
iii) UV/VIS Spectrophotometer.
iv) IR Spectrophotometer.

Figure 5:
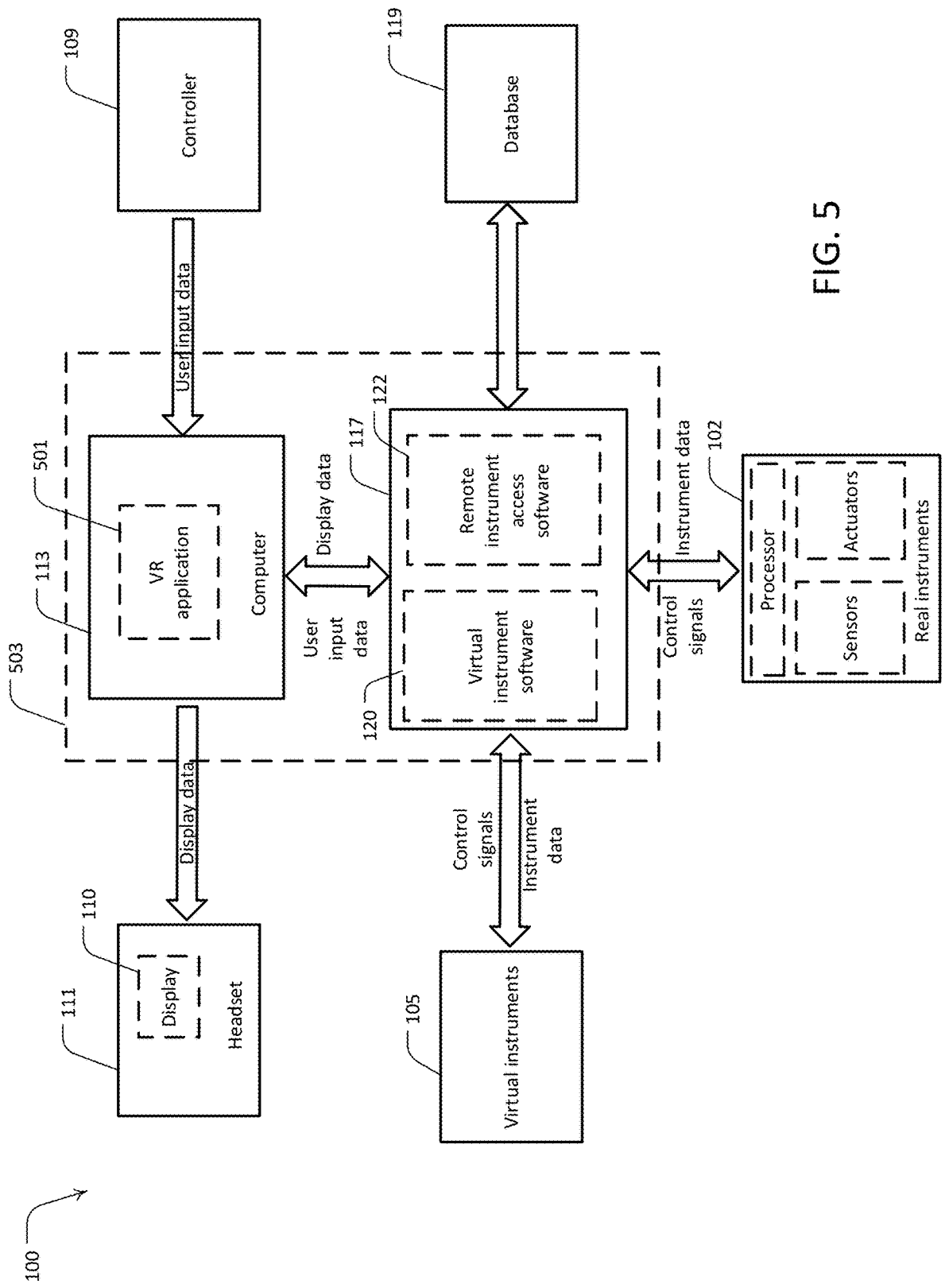
FIG. 5 is a schematic illustration of the system of FIG. 1 illustrating the data flows within the elements of the system.

Each of these menu items opens up direct remote access to a real instrument, which can be remotely controlled using remote instrument access software 122. This results in control signals being sent from instrument server 117 to control the real instrument based on the user input data from controller 109 and corresponding instrument data being sent from real instrument to instrument server 117 and subsequently to user terminal 107, as best illustrated in FIG. 5. In addition, in some embodiments, data may be sent from remote instrument access software 122 to virtual instrumentation software 120 during an instrument control process to train a machine learning algorithm (as mentioned above) to develop a dynamic virtual instrument model. As a result, scenarios of controlling virtual instruments can be updated based on the input from the real instruments. This is illustrated by arrow 140 in FIG. 3.

It will be appreciated that the functionality of dashboard 503 illustrated in FIGS. 6 to 10 is exemplary only and various other functionality is able to be provided. By way of example, dashboard 503 may provide capability for users to act as hosts to host one or more real or virtual instruments. Dashboard 503 may also provide capability for users to be designated with access to certain instruments based on specific criteria such as security clearance, expertise, training level and certification. The training and certification may also be facilitated through dashboard 503 using a learning management module discussed above. In some embodiments, dashboard 503 provides capability for users to offer prices for use of real or virtual instruments and payment gateways for facilitating payment of the use.

In some embodiments, different dashboards 503 may be hosted by different communities for accessing different or common real or virtual instruments. These different communities may offer different virtual access schemes which rely on the fundamental digital architecture described above such as generic APIs and control protocols.

Figure 11:
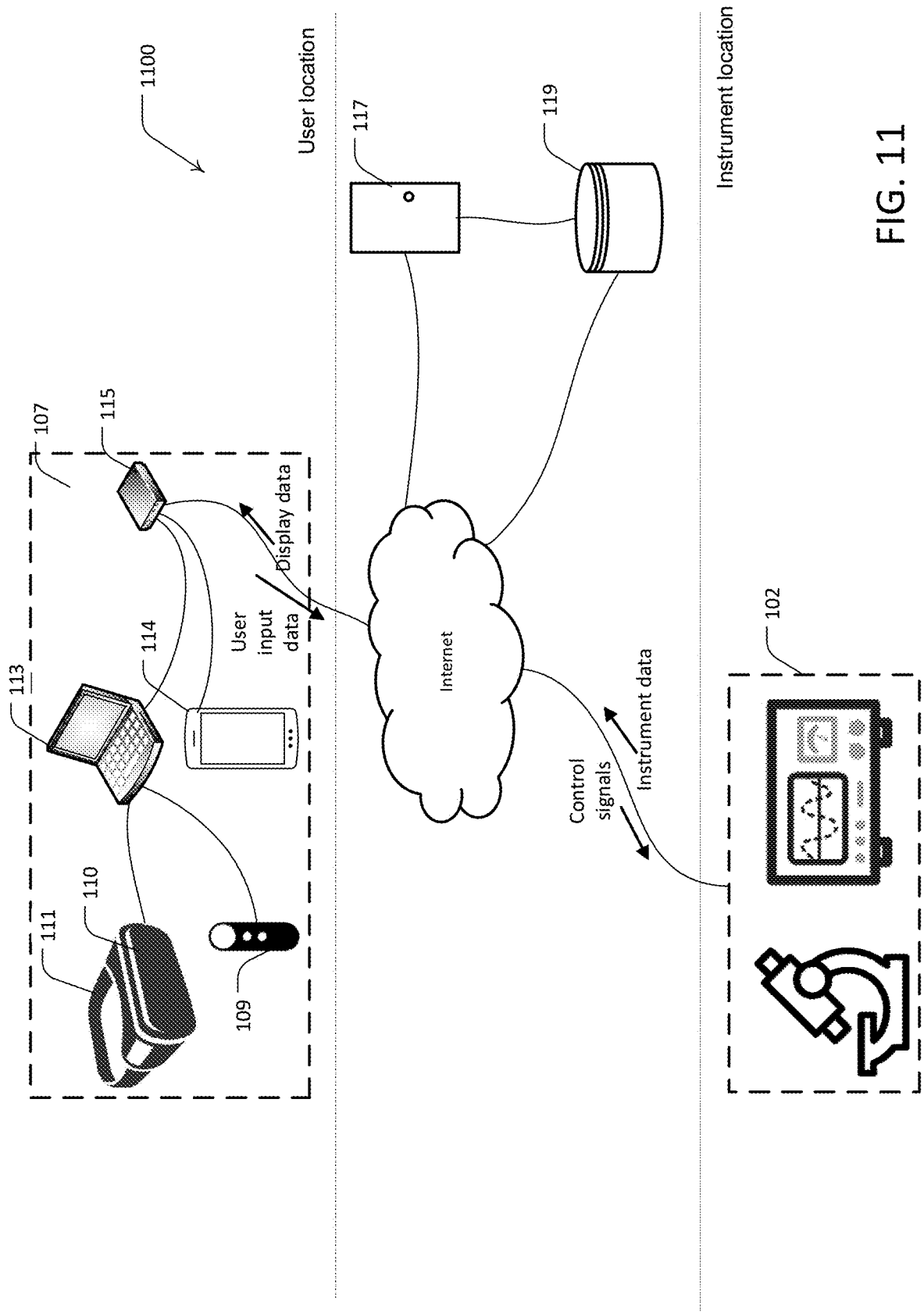
FIG. 11 is a schematic illustration of a system for remotely controlling scientific instruments.

Referring now to FIG. 11, in another embodiment of the invention, there is provided a system 1100 for remotely controlling scientific instruments 102. System 1100 is similar to that of system 100 but does not have capability for remotely accessing virtual instruments. Thus, system 1100 includes user terminal 107 at a user location for connecting with one or more real scientific instruments 102 located at an instrument location that is remote from the user location. User terminal includes user input device 109 configured to receive user input data, and display device 111 configured to receive display data. In response to receiving the display data, device 111 projects images visible to the user on a display of the display device in a manner described above. Internet enabled computer 113 is in communication with display device 111 and user input device 109. Computer 113 is configured for communicating with instrument server 1117 over the internet to send the user input data and receive the display data.

In system 1000, instrument server configured to host remote instrument access software associated with a plurality of real scientific instruments 102. The software is configured to allow the user to remotely access real instruments through one or more sensors and/or actuators embedded within or mounted to the instrument, similar to system 100. Instrument server 117 remotely controls the scientific instruments based on the user input data and sends the display data to computer 113 to allow the user to view data indicative of the scientific instruments 102 in real-time. This allows the user to remotely use the scientific instruments in real-time.

Once a user is connected with a real or virtual instrument, controller 109 and headset 111 are used to directly interface the user with sensors and actuators on-board the real instruments or equivalent virtual sensors/actuators on the virtual instruments. The user is presented with an immersive experience with the instrument. In the case of training modules on the virtual instruments, the user may be prompted to perform particular actions by the presentation of textual data, audio data or other visual stimulus. For example, textual data may be sent via the Google cloud messaging service (GCMS) to send messages to computer 113 regarding the status of the instrument. Visual data representing a livestream demonstration of the instrument may also be sent. Depending on the user's actions using controller 109, further feedback is provided to the user through headset 111.

In addition to presenting real-time data to the user, instrument server 117, collects real-time data, analyses the data and stores it in database 119, which may include or be connected to a Google cloud database system.

The real-time data may be viewed by third parties such as teachers. Further, the results or outcomes achieved by users in training modules may be communicated to an associated LMS 125 for verification that a student has completed a required educational unit.

Conclusions

The above described system provides users with both interactive and engaging experiences for learning the operation of and regulatory requirements associated with scientific instruments. Further, the system offers a cost-effective and sustainable solution for using expensive scientific instruments typically only available at large research institutions. Example advantages of the system include:

Instant access to scientific instrumentations without the need for owning or hiring the instruments, or travelling to the locations of the instruments.

Interactive and immersive real job scenarios for science students and graduates.

Human capital pool of already on-the-job trained entry-level employees and interns that are looking to grow their internal capabilities through more effective learning techniques.

Using the above described system, a user can learn interactively how to operate a particular instrument through the virtual instrument software and subsequently operate the instrument remotely through the real instrument software.

Furthermore, the system described above provides enhanced accessibility to instruments accessed remotely over the internet by providing a generic API that is separate to an instrument's specific API. This generic API also allows for remote accessibility to a wider range of instruments regardless of their operating APIs and restrictions.

The system also provides for generating dynamic virtual instruments based on feedback from use of real instruments and a machine learning algorithm. The system learns the operation of real instruments to build more accurate virtual instruments for remote instrument training and education.

Interpretation

Use of the term "instrument" throughout the specification is intended to refer to any tool, system or device that is capable of performing work and/or conducting measurements of parameters. By way of example, instruments may be scientific instruments for measuring real-world parameters or machinery for cutting, moving or manipulating materials.

The term "real-time" is used throughout the specification. Within the scope of this specification, real-time refers to the virtually immediate processes that are performed by one or more computer processors and associated systems to provide feedback to a user. It will be appreciated that each process performed by a computer processor requires a finite amount of processing time and the delivery of feedback to a user may include delays and/or variations in speed. Such delays in time are typically not longer than milliseconds but, in some instances, may extend to several seconds. Thus, use the term real-time in this specification extends to content delivered to a user at some point after an action or process is initiated and may also extend to processes deemed otherwise to be "near real-time".

Unless specifically stated otherwise, as apparent from the following discussions, it is appreciated that throughout the specification discussions utilizing terms such as "processing," "computing," "calculating," "determining", "analysing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Embodiments described herein are intended to cover any adaptations or variations of the present invention. Although the present invention has been described and explained in terms of particular exemplary embodiments, one skilled in the art will realize that additional embodiments can be readily envisioned that are within the scope of the present invention.

What is claimed is:

1. A system for remotely accessing a real instrument which has an associated digital twin instrument, the system including:
   a user terminal for virtually connecting with the real instrument, the user terminal including:
      a user input device configured to receive user input data;
      a display device configured to receive display data and, in response, project images visible to the user on a display of the display device; and
      an internet enabled computer in communication with the display device and user input device, the internet enabled computer configured for communicating with an instrument server to send the user input data and receive the display data;
   an instrument server configured to host software associated with the real instrument, the software including:
      virtual instrument software configured to virtually represent the associated digital twin instrument by a static model, wherein the static model includes at least a three-dimensional model of the associated digital twin instrument, including the same inputs and outputs and software to run the real instrument; and
      remote instrument access software configured to allow the user to remotely access the real instrument through one or more sensors and/or actuators embedded within or mounted to the real instrument;
   wherein the instrument server is further configured to:
      remotely control the real instrument based on the user input data;
      in response to the user input data, generate instrument data indicative of a current state of the real instrument as modified by the user input data;
      generate display data associated with the instrument data;
      send the display data to the internet enabled computer to allow the user to view data indicative of the real instrument in real-time thereby to simulate the user using the real instrument in real-time; and
      execute a machine learning process to iteratively learn patterns and relationships between the inputs and outputs to the real instrument to learn how the real instrument operates and to build a dynamic model of the associated digital twin instrument by updating the virtual instrument software of the associated digital twin instrument based on received instrument data from the real instrument, by updating or adding rules or functions to the static model of the virtual instrument.

2. The system according to claim 1 wherein the one or more sensors includes a camera mounted on or relative to the real instrument.

3. The system according to claim 1 wherein the one or more sensors includes sensors native to the real instrument.

4. The system according to claim 1 wherein the one or more actuators include instrument control mechanisms native to the real instrument.

5. The system according to claim 1 wherein the one or more actuators include a robotic arm mounted to or adjacent the real instrument.

6. The system according to claim 1 wherein the software includes an educational module for educating the user how to use the instrument; and the educational module is configured to give access to the associated digital twin instrument using the dynamic model of the associated digital twin instrument.

7. The system according to claim 1 wherein the instrument server is further configured to store instrument information obtained during use by the user in a cloud database.

8. The system according to claim 1 wherein the instrument server is configured to communicate with a learning management system to integrate the educational module with a structured assessment of the user.

9. The system according to claim 1 wherein the instrument server uses instrument data indicative of a current state of the real instrument to update the virtual instrument software.

10. The system according to claim 1 wherein the data indicative of the real instrument includes a visual representation of the instrument.

11. The system according to claim 1 wherein the data indicative of the real instrument includes operational parameters of the instrument.

12. The system according to claim 1 wherein the remote instrument access software includes a central application programming interface (API) that is separate to the real instrument's dedicated API to allow the user to remotely access the real instrument via the central API.

13. The system according to claim 12 wherein the central API is hosted by the instrument server.

14. The system according to claim 12 wherein the central API allows a user to bypass a real instrument's dedicated API to control the real instrument.

15. A method for remotely accessing a real instrument which has an associated digital twin instrument, the method including the steps:
receiving user input data from a user input device in relation to operation of the real instrument;
sending the user input data to an instrument server;
hosting, on the instrument server, software associated with the real instrument, the software including:
virtual instrument software configured to virtually represent the associated digital twin instrument by a static model, wherein the static model includes at least a three-dimensional model of the associated digital twin instrument, including the same inputs and outputs and software to run the real instrument; and
remote instrument access software configured to allow the user to remotely access the real instrument through one or more sensors and/or actuators embedded within or mounted to the real instrument;
remotely controlling the real instrument based on the user input data;
deriving instrument data indicative of a current state of the real instrument as modified by the user input data;
deriving display data based on the instrument data; and
representing the display data on a display of a display device thereby to enable the user to view data indicative of the real instrument in real-time;
wherein the instrument server is configured to execute a machine learning process to build a dynamic model of the associated digital twin instrument by updating the virtual instrument software of the associated digital twin instrument associated with the real instrument based on derived instrument data from the real instrument.

16. A method of generating a virtual instrument based on operation of a real instrument, the method including:
generating a static virtual instrument model representing a digital version of a corresponding real instrument, the static virtual instrument model including at least a three-dimensional model of the real instrument, predefined inputs and outputs, and instrument operating functions;
receiving operational data of the corresponding real instrument, the operational data including user inputs and instrument outputs;
passing the operational data to a machine learning algorithm to determine relationships between the user inputs and instrument outputs;
executing a machine learning algorithm process to iteratively learn patterns and relationships between the inputs and outputs to the real instrument to learn how the real instrument operates and to build a dynamic model of the virtual instrument by updating the virtual instrument software of the virtual instrument based on received instrument data from the real instrument, by updating or adding rules or functions to the static virtual instrument model; and
based on the relationships determined, updating the instrument operating functions of the virtual instrument model to generate a virtual instrument.

17. The method according to claim 16 wherein the operational data includes data indicative of a current state of the corresponding real instrument and wherein the machine learning algorithm also determines relationships between the current state of the corresponding real instrument and the instrument outputs to update the instrument operating functions of the virtual instrument.

18. The method according to claim 16 wherein, in response to the determined relationships, the machine learning algorithm transmits notifications to a server hosting the virtual instrument to update operating software for the virtual instrument.

* * * * *